US012282981B2

(12) United States Patent
Liu et al.

(10) Patent No.: US 12,282,981 B2
(45) Date of Patent: Apr. 22, 2025

(54) AUGMENTATION FOR WEB CONFERENCE PARTICIPANTS

(71) Applicant: INTERNATIONAL BUSINESS MACHINES CORPORATION, Armonk, NY (US)

(72) Inventors: Su Liu, Austin, TX (US); Jill S. Dhillon, Laguna Niguel, CA (US); Luis Osvaldo Pizana, Austin, TX (US); Yang Liang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 17/932,072

(22) Filed: Sep. 14, 2022

(65) Prior Publication Data
US 2024/0087177 A1    Mar. 14, 2024

(51) Int. Cl.
*G06T 11/00* (2006.01)
*G06T 7/11* (2017.01)
(Continued)

(52) U.S. Cl.
CPC ............... *G06T 11/00* (2013.01); *G06T 7/11* (2017.01); *G06V 20/41* (2022.01); *G10L 17/02* (2013.01); *G10L 25/57* (2013.01); *H04L 65/403* (2013.01); *G06T 2207/10016* (2013.01); *G06T 2207/20021* (2013.01); *G06T 2207/20092* (2013.01); *G06T 2207/30196* (2013.01)

(58) Field of Classification Search
None
See application file for complete search history.

(56) References Cited

U.S. PATENT DOCUMENTS 6,307,568 B1    10/2001    Rom
9,105,013 B2    8/2015    Chavez
(Continued)

FOREIGN PATENT DOCUMENTS

CN    110102048 A    8/2019
WO    2014074072 A1    5/2014

OTHER PUBLICATIONS

Dai et al., "Clothing Fashion Style Recommendation System", A Thesis Presented, Northeastern University, Boston Massachusetts, May 2015, 30 Pgs.
(Continued)

*Primary Examiner* — Daniel F Hajnik
*Assistant Examiner* — Jed-Justin Imperial
(74) *Attorney, Agent, or Firm* — James L. Olsen

(57) ABSTRACT

Aspects of the present disclosure relate to augmentation for web conference participants. An augmentation rule set defining mappings between augmentations and participant characteristics can be received, where the augmentation rule set is implemented for a web conference to determine augmentations to apply onto participant video feeds within the web conference. A plurality of participants within the web conference can be identified. The web conference can be analyzed to determine participant characteristics of each participant of the plurality within the web conference. Augmentation can be applied on respective video feeds of each participant according to the augmentation rule set based on the determined characteristics of each participant.

17 Claims, 5 Drawing Sheets

(51) Int. Cl.
*G06V 20/40* (2022.01)
*G10L 17/02* (2013.01)
*G10L 25/57* (2013.01)
*H04L 65/403* (2022.01)

(56) References Cited

U.S. PATENT DOCUMENTS

| | | | |
|---|---|---|---|
| 10,417,613 B1* | 9/2019 | Brisebois | G06F 21/554 |
| 11,190,735 B1* | 11/2021 | Trim | G06V 20/52 |
| 2016/0232941 A1 | 8/2016 | Cunico | |
| 2019/0287306 A1* | 9/2019 | Wieser | G06T 17/20 |
| 2022/0230396 A1* | 7/2022 | Croxford | G02B 27/0103 |

OTHER PUBLICATIONS

IBM Watson Media, "Live Event Streaming Solution", Downloaded Aug. 3, 2022, 9 Pgs, <https://www.ibm.com/watson/media/live-event-streaming-services>.

No Author, "Hardware & Software IT Services", Web Conference Software Market Size, Share Growth Global Report [2027], Report ID: FB1102993, Downloaded Aug. 3, 2022, 9 Pgs, <https://www.fortunebusinessinsights.com/web-conference-software-market-102993>.

Yu-Chu et al., "Personalized Clothing-Recommendation System Bases on a Modified Bayesian Network", 2012 IEEE/IPSJ 12th International Symposium on Applications and the Internet, D01 10.1109/SAINT.2012.75, Downloaded Aug. 3, 2022, 4 Pgs.

* cited by examiner

AUGMENTATION FOR WEB CONFERENCE PARTICIPANTS

BACKGROUND

The present disclosure relates generally to the field of computing, and in particular, to augmentation for web conference participants.

Web conferencing software facilitates communication between individuals online via transmission of audio/video (A/V) data of the individuals in real-time over a network.

SUMMARY

Aspects of the present disclosure relate to a computer program product, system, and method for augmentation for web conference participants. An augmentation rule set defining mappings between augmentations and participant characteristics can be received, where the augmentation rule set is implemented for a web conference to determine augmentations to apply onto participant video feeds within the web conference. A plurality of participants within the web conference can be identified. The web conference can be analyzed to determine participant characteristics of each participant of the plurality within the web conference. Augmentation can be applied on respective video feeds of each participant according to the augmentation rule set based on the determined characteristics of each participant.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
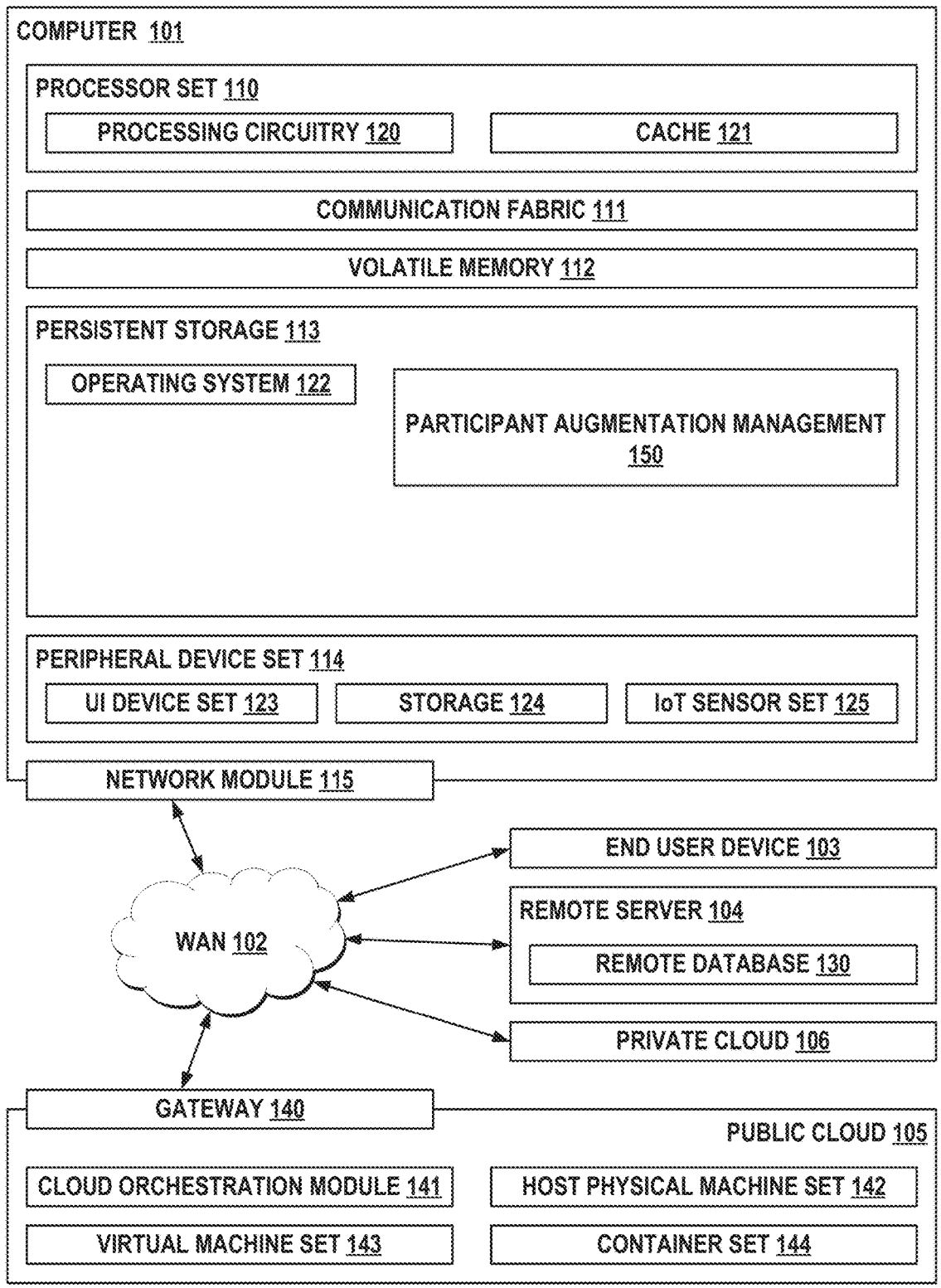
FIG. 1 is a high-level block diagram illustrating an example computer system and network environment that can be used in implementing one or more of the methods, tools, modules, and any related functions described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to augmentation for web conference participants. While the present disclosure is not necessarily limited to such applications, various aspects of the disclosure may be appreciated through a discussion of various examples using this context.

Web conferencing software facilitates communication between individuals online via transmission of audio/video (A/V) data of the individuals in real-time over a network. Web conferencing offers real-time point-to-point communications from one sender to many receivers. Web conference services allow text, audio, and/or video data to be shared simultaneously across geographically dispersed locations. Though web conferences have increased the ability for individuals to communicate in real-time, there are still improvements that need to be made.

Current web conference technology allows participants to overlay their background with an augmented layer (e.g., a virtualized background or digital background). This can be completed such that the user's environment appears a certain way. For example, if a user attending a meeting is in a particular setting (e.g., outside, in a coffee shop, etc.), they can select an option to change their background to different setting (e.g., a conference room). However, current web conference technology does not have the functionality to allow participants to customize their own appearance. This can be useful to participants as it can allow them to match a particular appearance or attire code (e.g., a professional or cultural attire) without actually physically dressing or otherwise appearing in the desired manner. This can be useful to participants in a variety of manners, including to increase engagement within meetings, minimize distractions within meetings, enhance optics for participants (e.g., enhance professionalism), for entertainment, to match a team or subgroup within the meeting, or for any other suitable reason.

Aspects of the present disclosure relate to augmentation for web conference participants. An augmentation rule set defining mappings between augmentations and participant characteristics can be received, where the augmentation rule set is implemented for a web conference to determine augmentations to apply onto participant video feeds within the web conference. A plurality of participants within the web conference can be identified. The web conference can be analyzed to determine participant characteristics of each participant of the plurality within the web conference. Augmentation can be applied on respective video feeds of each participant according to the augmentation rule set based on the determined characteristics of each participant.

Aspects of the present disclosure provide various improvements, including those listed above. For example, aspects can increase engagement within meetings, minimize distractions within meetings, enhance optics for participants (e.g., enhance professionalism), provide entertainment, and provide a mechanism for teams/subgroups within meetings to visually relate. Because the augmentations to apply can be learned using machine learning, processing efficiency can be enhanced, as more efficient selection of augmentation rules to apply can be completed as the training of the machine learning algorithm occurs. Further still, as participants sharing similar characteristics can be augmented in similar manners, other participants can readily discern relationships between participants within the web conference based on the applied visual augmentations.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a high-level block diagram illustrating an example computing environment 100 that can be used in implementing one or more of the methods, tools, modules, and any related functions described herein, in accordance with embodiments of the present disclosure. Computing environment 100 contains an example of an environment for the execution of at least some of the computer code involved in performing the inventive methods, such as participant augmentation management 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
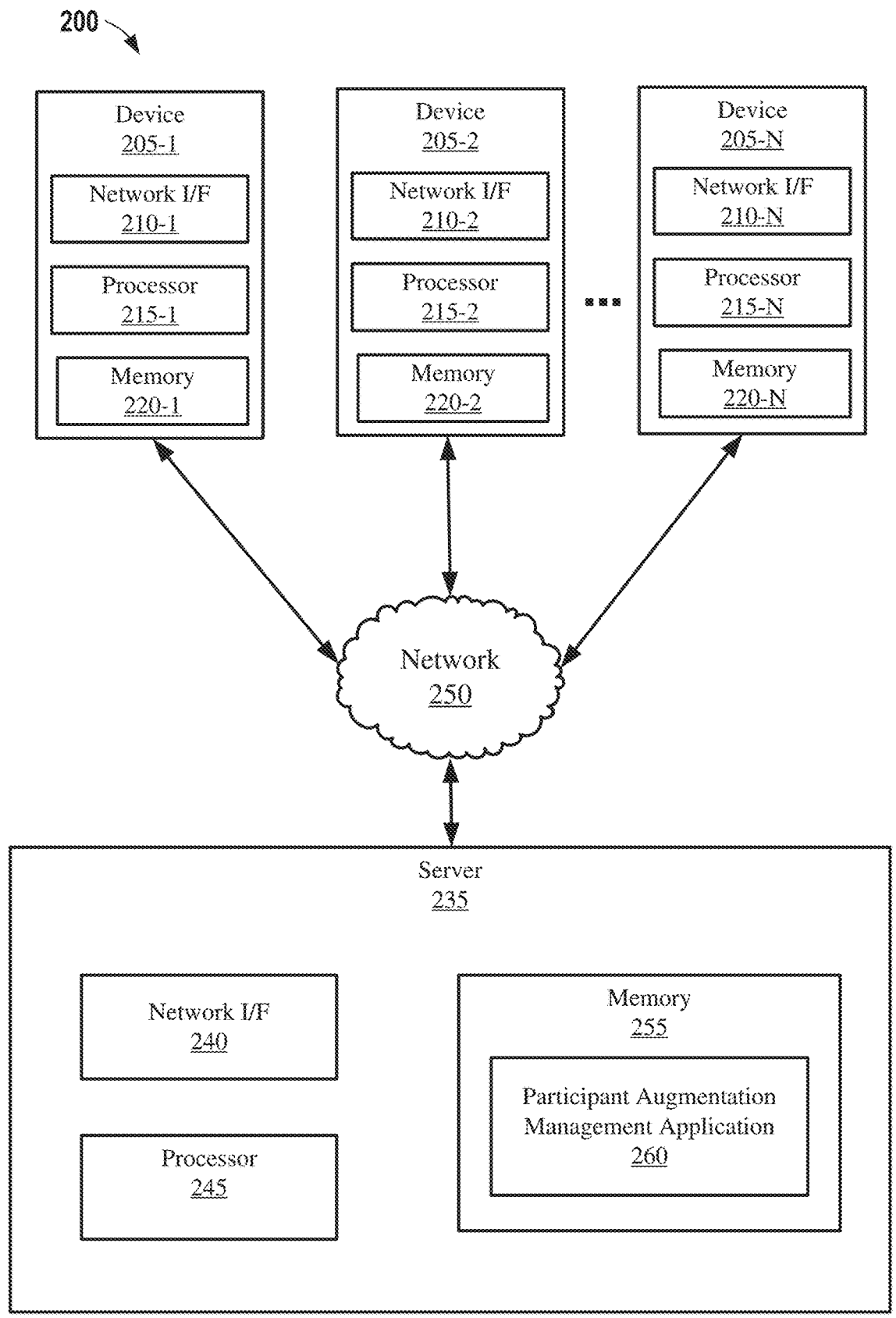
FIG. 2 is block diagram illustrating an example network environment, in accordance with embodiments of the present disclosure.

FIG. 2 is a block diagram illustrating an example computing environment 200 in which illustrative embodiments of the present disclosure can be implemented. Computing environment 200 includes a plurality of devices 205-1, 205-2 . . . 205-N (collectively devices 205), at least one server 235, and a network 250.

The devices 205 and the server 235 include one or more processors 215-1, 215-2, . . . , 215-N (collectively processors 215) and 245 and one or more memories 220-1, 220-2, . . . , 220-N (collectively memories 220) and 255, respectively. The processors 215 and 245 can be same as, or substantially similar to, processor set 110 of FIG. 1. The memories 220 and 255 can be the same as, or substantially similar to volatile memory 112 and/or persistent storage 113 of FIG. 1.

The devices 205 and the server 235 can be configured to communicate with each other through internal or external network interfaces 210-1, 210-2 . . . 210-N (collectively network interfaces 210) and 240. The network interfaces 210 and 240 are, in some embodiments, modems or network interface cards. The network interfaces 210 and 240 can be the same as, or substantially similar to, network module 115 described with respect to FIG. 1.

The devices 205 and/or the server 235 can be equipped with a display or monitor. Additionally, the devices 205 and/or the server 235 can include optional input devices (e.g., a keyboard, mouse, scanner, a biometric scanner, video camera, or other input device), and/or any commercially available or custom software (e.g., web conference software, browser software, communications software, server software, natural language processing software, search engine and/or web crawling software, image processing software, etc.). For example, devices 205 and/or server 235 can include components/devices such as those described with respect to peripheral device set 114 of FIG. 1. The devices 205 and/or the server 235 can be servers, desktops, laptops, or hand-held devices. The devices 205 and/or the server 235 can be the same as, or substantially similar to, computer 101, remote server 104, and/or end user device 103 described with respect to FIG. 1.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. In embodiments, the network 250 can be the same as, or substantially similar to, WAN 102 described with respect to FIG. 1. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In embodiments, network 250 can be coupled with public cloud 105 and/or private cloud 106 described with respect to FIG. 1.

The server 235 includes a participant augmentation management application (PAMA) 260. The PAMA 260 can be configured to apply augmentations (e.g., virtual attire or other virtual objects, color changes, feature morphs, etc.) onto participant video feeds within web conferences based on participant characteristics.

The PAMA 260 can first be configured to receive an indication of an initiated web conference. The web conference can be hosted on web conference software (not shown), which can be provided by server 235, devices 205, or another component. The PAMA 260 can be integrated with, interoperable with, or otherwise coupled with web conference software. The PAMA 260 can receive indications of initiated web conferences via an application programming interface (API). The PAMA 260 can initiate functionality for participant augmentation in response to an initiated web conference. In some embodiments, PAMA 260 can continuously run as a background application/service during web conferences such that augmentation management of participants can be provided over time. In embodiments, functionality by the PAMA 260 can be initiated in response to a command (e.g., a user command selecting a participant augmentation option on a graphical user interface (GUI)).

The PAMA 260 can be configured to obtain or define an augmentation rule set for the initiated web conference. An "augmentation rule set" defines augmentations to make based on observed participant characteristics. That is, the augmentation rule set maps augmentations to augment onto participant video feeds to observed participant characteristics (e.g., a geolocation of participants, a role/team/organization/classification participants belong to, visual characteristics of participants, audio characteristics of participants, etc.). As referenced herein, "augmentations" to apply onto participant video feeds refer to particular virtual objects, colors, images, feature changes/morphs etc. to augment (e.g., via pixel modification) on respective participant video feeds. Augmentations can include virtual attire (e.g., virtual glasses, virtual hats, virtual shirts, virtual suits, etc.), virtual objects (e.g., symbols, shapes, items, etc.), avatars (e.g., fictional characters), color changes, feature morphs, and other potential augmentations.

In embodiments, the obtained or defined augmentation rule set depends on web conference meeting characteristics. For example, the augmentation rules defined within the augmentation rule set can be based on a participant list of the web conference meeting, a meeting type of the web conference (e.g., an internal meeting versus an external meeting), a time of web conference, a host of the web conference, and/or other potential web conference meeting characteristics. In embodiments, the augmentation rule set can be manually defined (e.g., by a host, admin, or one or more participants of the web-conference). In embodiments, the augmentation rule set can be automatically defined using artificial intelligence (AI)/machine learning (ML) techniques based on historical web conference data and historically applied augmentation rule sets.

Upon receiving a defined augmentation rule set, participants within the web conference can be identified. Identifying participants within the web conference can include referencing a participant list including each participant within the initiated web conference. Characteristics of the identified participants can then be determined. Characteristics for participants that can be determined include information such as their role, team, organization, geo-location, audio characteristics (e.g., tone, speech characteristics, uttered words/phrases), and visual characteristics (e.g., current attire style/color, hair style, hair color, etc.), among other potential participant characteristics. These characteristics can be used to augment the participants in particular manners based on the defined augmentation rule set. For example, a first participant characteristic (e.g., role 1, sales) can be mapped to a first augmentation (e.g., a first virtual attire augmentation, such as augmented red shirts), a second participant characteristic (e.g., role 2, engineering) can be mapped to a second augmentation (e.g., augmented white shirts), a third participant characteristic (e.g., role 3, research) can be mapped to a third augmentation (e.g., augmented blue shirts), etc.

Once participant characteristics have been identified, the augmentation rule set can be referenced to determine augmentations to apply to each video feed of each participant. The augmentation rule set can provide a mapping between particular participant characteristics (e.g., or combinations of characteristics) and particular augmentations (e.g., or combinations of augmentations). For example, in response to identifying that a first participant has a first characteristic (e.g., the first participant is from a first geo-location), a corresponding augmentation mapped to the first characteristic can be determined to be used for the first participant. This can be completed for each participant within the web conference. Thus, in embodiments, participants sharing characteristics can be augmented in similar manners, allowing other participants to visually understand relationships/characteristics associated with other participants within the web conference.

Upon determining augmentations to apply to each participant video feed within the web conference, the participants can be augmented with the augmentations defined within the augmentation rule set. As referenced herein "augmenting" a video feed of a participant can include modifying pixels within the video feed to achieve the desired augmentations. For example, "augmenting" can include overlaying colors/images/objects over particular pixels/areas within the video feed of the participant. The specific colors, images, and/or objects to overlay/modify depend on the specific defined augmentation. For example, a first augmentation, white shirt, can include modifying all pixels associated with a participant's shirt area to white (e.g., 255, 255, 255 within a red, green, blue (RGB) pixel code). Alternatively, the first augmentation, white shirt, can include overlaying an image or object corresponding to a white shirt over a specific set of pixels within a participant video feed. In some embodiments, "augmenting" refers to morphing (e.g., enlarging, minimizing, blurring, obfuscating, or otherwise morphing) features associated with participants (e.g., via pixel modification) within video feeds.

In embodiments, image segmentation techniques can be used to segment the video feed of each participant into a portion to modify (e.g., an area corresponding to an area to apply an augmentation) and a portion to leave unmodified. In embodiments, the portions to modify (e.g., pixels to modify or overlay) and the portions to leave unmodified (e.g., pixels to leave unmodified) can depend on each specific augmentation to apply. For example, a first augmentation (e.g., virtual glasses) may require modification of pixels corresponding to participants' head, while a second augmentation (e.g., a virtual t-shirt) may require modification of pixels corresponding to participants' bodies. In embodiments, segmentation of video feeds to identify a portion of the video feed to modify and a portion of the video feed to leave unmodified can include methods for semantic segmentation (e.g., determining a class of object (e.g., shirt) for each pixel), instance segmentation (e.g., determining a specific instance of an object (e.g., a first participant's shirt) for each pixel), and/or panoptic segmentation (e.g., a hybrid approach where distinguishments of different instances of the same class of object can be made).

Image segmentation can, in embodiments, utilize one or more machine learning algorithms, such as neural networks. Training of machine learning algorithms can occur over time such that real-time identification of pixels of video feeds of participants to modify based on specific augmentations to apply can be completed. For example, a neural network can be trained over time to identify pixels associated with a first body area (e.g., shoulder, head, chest, etc.) such that a first virtual augmentation can be applied on the pixels associated with the first body area. Thus, each augmentation to apply can be mapped to a specific feature (e.g., body area) associated with participants, and each specific feature to modify can be learned overtime using machine learning techniques (e.g., supervised or unsupervised machine learning).

A variety of image segmentation techniques can be used to identify portions of video feeds to modify (e.g., to apply augmentations to) including, but not limited to: clustering (e.g., K-means clustering), compression-based methods, histogram-based methods, edge detection, region-growing, partial differential equal-based methods (e.g., parametric methods, level-set methods, fast marching methods), graph partitioning methods (e.g., Markov random fields (MRF)), watershed transformation, model-based segmentation, multi-scale segmentation, semi-automatic segmentation, and trainable segmentation (e.g., neural networks such as U-Net), among other image segmentation techniques.

Upon applying augmentations on each participant video feed in accordance with the augmentation rule set, the web conference can continue to be monitored to update augmentation locations based on participant movement within video feeds (e.g., such that augmentations can track each participant's body in motion) and/or to determine whether any new augmentations should be applied (e.g., whether any additional augmentation rules within the augmentation rule set are met).

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN 102, a LAN, a wired connection, an intranet, or the Internet).

Though this disclosure pertains to the collection of personal data (e.g., participant identities/characteristics), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

Figure 3:
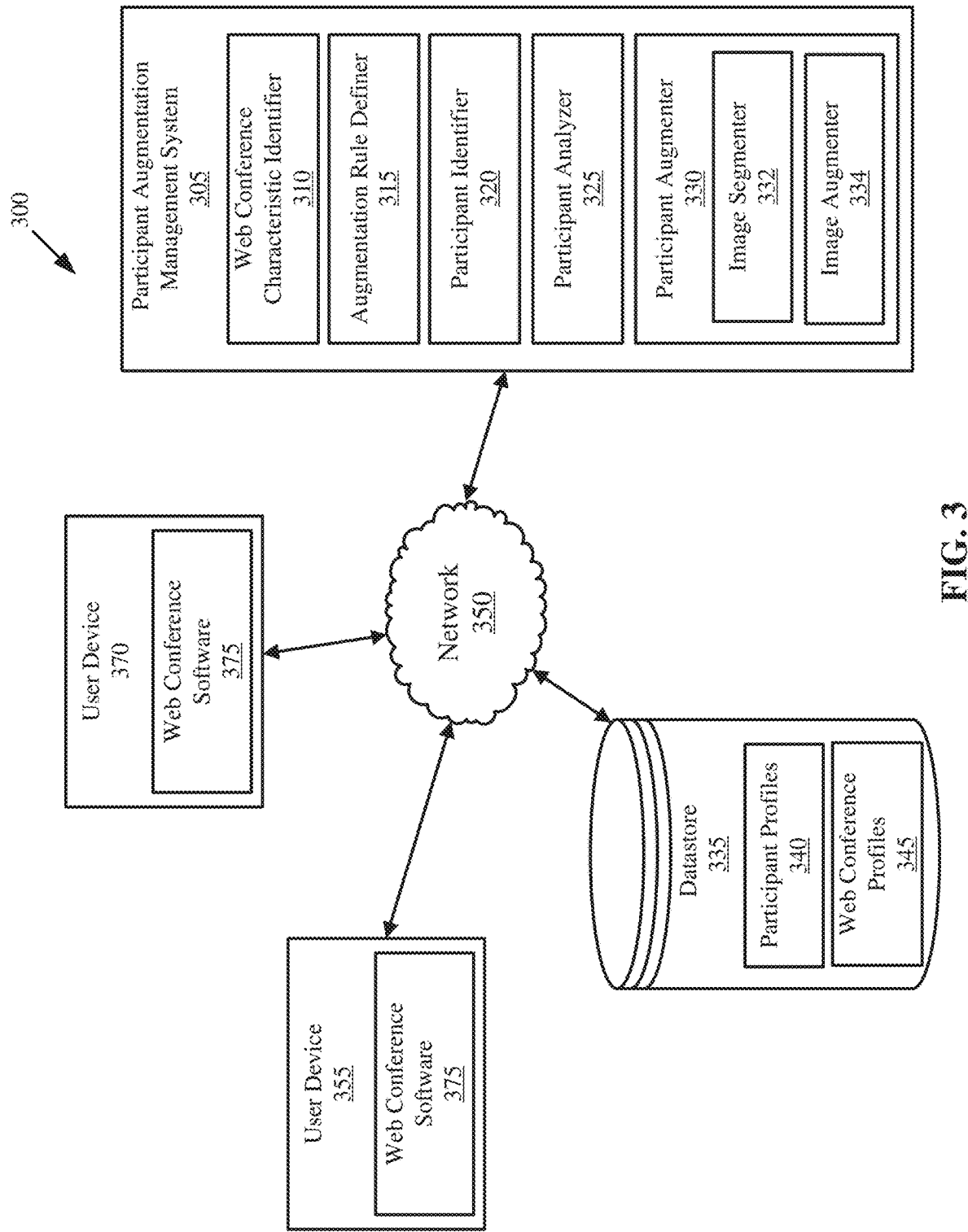
FIG. 3 is a block diagram illustrating an example network environment including participant augmentation management system, in accordance with embodiments of the present disclosure.

Referring now to FIG. 3, shown is a block diagram illustrating an example network environment 300 in which illustrative embodiments of the present disclosure can be implemented. The network environment 300 includes a participant augmentation management system (PAMS) 305, a user device 355, a user device 370, and a datastore 335, each of which can be communicatively coupled for inter-component interaction via a network 350. In embodiments, the network 350 can be the same as, or substantially similar to, network 250 and/or WAN 102. In embodiments, the user devices 355, 370 and PAMS 305 can be the same as, or substantially similar to, computer 101, devices 205, and/or server 235.

The PAMS 305 can be configured apply augmentations onto participant video feeds based on determined characteristics associated with each participant. The PAMS 305 includes a web conference characteristic identifier 310, an augmentation rule definer 315, a participant identifier 320, a participant analyzer 325, and a participant augmenter 330. The functionalities of the web conference characteristic identifier 310, augmentation rule definer 315, participant identifier 320, participant analyzer 325, and participant augmenter 330 can be processor-executable instructions that can be executed by a dedicated or shared processor using received inputs.

The PAMS 305 can first be established with required prerequisites and/or configuration settings. For example, the PAMS 305 can be configured such that it can access data sources (e.g., via user authorization) required for performing participant augmentation. For example, opt-in integration can be established such that participant characteristic data (e.g., participant role, participant organization, participant team, participant geo-location, etc.) can be obtained from enterprises. Other data source access that can be authorized by users can include, but is not limited to, project data, social media data, past web conference data, and location data.

Further, the PAMS 305 can be configured to access/interface web conference software 375 such that data can be obtained from web-based conferences and such that augmentation of participant video feeds within web conference software 375 can be completed. Data that can be obtained from web conference software 375 can include, but is not limited to, audio/video (A/V) data, chat transcripts, web conference information (e.g., meeting name, meeting number, call-in information, etc.), and participant information (e.g., usernames, host names, administrative users, etc.).

Further, settings for augmentation (augmentation rule sets) can be defined such that augmentation of participants within the web conference can be performed as desired. For example, a user (e.g., an administrator) can define whether they would like manual definition or automatic learning (e.g., via ML) of augmentation rules within augmentation rule sets.

The web conference characteristic identifier 310 can be configured to determine characteristics associated with an initiated web conference for which participant augmentation is to be performed. In embodiments, augmentation rule sets determined by the augmentation rule definer 315 can depend on particular web conference characteristics. For example, augmentation rule sets to apply can depend on a time of the web conference, an identification (ID) (e.g., a meeting ID) associated with the web conference, a participant list associated with the web conference, a host of the web conference, a name of the web conference, a host geo-location of the web conference, and other potential web conference characteristics. Thus, aspects recognize that different augmentation rule sets (e.g., a first augmentation rule set mapping a first set of augmentations to a first set of participant characteristics versus a second augmentation rule set mapping a second set of augmentations to a second set of participant characteristics) can be selected/defined/obtained based on different web conference characteristics (e.g., a first meeting name versus a second meeting name, a first participant list versus a second participant list, a first meeting host versus a second meeting host, a first meeting time slot versus a second meeting time slot, etc.). As an example, any web conference with a first meeting host may have a first augmentation rule set and any web conference with a second meeting host may have a second augmentation rule set. In this example, the first and second augmentation rule sets can define different augmentations to make based on different observed participant characteristics.

In embodiments, the web conference characteristic identifier 310 can be configured to reference web conference profiles 345 stored within datastore 335 to identify/obtain augmentation rule sets mapped to particular web conference characteristics. For example, following the example above, the web conference profiles 345 can define that any web conference with a first meeting host has a first augmentation rule set and any web conference with a second meeting host has a second augmentation rule set. As another example, web conference profiles 345 can indicate that any meeting at a first time slot (e.g., 1:00 PM) hosted in a first geo-location (e.g., India) can have a first augmentation rule set and that any meeting at a second time slot (e.g., 9:00 PM) hosted in a second geo-location (e.g., Japan) can have a second augmentation rule set. However, any suitable augmentation rules can be defined based on any suitable observed web conference characteristics. Further, any suitable mapping between web conference characteristics and augmentation rule sets can be stored within web conference profiles 345.

The augmentation rule definer 315 can be configured to define augmentation rule sets. Augmentation rules define specific mappings between observed participant characteristics and augmentations to apply onto participant video feeds. Any suitable number of participant characteristics can be mapped to any suitable number of augmentations within an augmentation rule. For example, augmentation rule definer 315 can define that two observed participant characteristics (e.g., a geo-location and participant role) can be mapped to a first augmentation. In this example, upon determining that a participant has the two participant characteristics defined within the augmentation rule (e.g., the participant matches the geo-location and participant role), the first augmentation mapped to the two observed participant characteristics can be applied on the participant's video feed. Any suitable number of mappings (e.g., 1-to-1, 2-to-1, 3-to-1, 3-to-2, etc.) between observed participant characteristics and augmentations to apply can be implemented without departing from the spirit and scope of the present disclosure. For example, a 3-to-2 mapping of an augmentation rule could indicate that upon observing (e.g., determining) three participant characteristics associated with a first participant (e.g., a first role of the first participant, a first organization of the first participant, and a first geo-location of the first participant), then two augmentations (e.g., a virtual shirt and a virtual tie) can be applied to the first participant's video feed.

The augmentation rule definer 315 can define augmentation rules in any suitable manner. In embodiments, the augmentation rule definer 315 can define augmentation rules based on manual user definition. For example, upon initiation of a web conference, a host or administrator of the web conference can set one or more augmentation rules for the web conference. Thus, in some embodiments, the augmentation rule set can be defined by one or more users upon initiation of the web conference (e.g., as opposed to, or in addition to, pre-defined augmentation rule sets retrieved from web conference profiles 345). In embodiments, manually defined augmentation rules can be stored within web conference profiles 345 as an association between the defined augmentation rules and the characteristics of the web conference for which the augmentation rule set was defined. For example, if a user manually defines a first augmentation rule set for a web conference having a first set of web conference characteristics (e.g., a first host, a first time slot, a first host geo-location, a first meeting ID, a first participant list, etc.), then the first augmentation rule set can be mapped to the first set of web conference characteristics within web conference profiles 345. Thus, in embodiments, upon any future meetings with the first set of web conference characteristics being initiated, then the first augmentation rule set can be retrieved and applied.

In some embodiments, the augmentation rule definer 315 can be configured to apply AI/ML algorithms to automatically define augmentation rules for an initiated web conference based on historical data (e.g., historical web conference characteristics and/or participant characteristics and associated historically defined augmentation rule sets). AI/ML algorithms that can be used to determine augmentation rules to apply for an initiated web conference based on historical data include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to the PAMS 305 and/or datastore 335 can be analyzed or utilized as training data using any of the aforementioned machine learning algorithms.

More specifically, the AI/ML algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other techniques.

The participant identifier 320 can be configured to identify participants within the web conference such that augmentation for the identified participants can be completed. Identification of participants can be completed in any suitable manner. In embodiments, participants can be identified based on a participant list of invited individuals and/or based on individuals that have accepted a meeting invite to the web conference. In some embodiments, participants can be identified as defined/provided by a user. In some embodiments, participants can be identified during a live web-conference via voice recognition, via image recognition, based on username, or any other suitable method.

In embodiments, upon identifying a participant, an entry within participant profiles 340 corresponding to the participant can be referenced/stored within datastore 335. If the user has not previously existed, a new entry can be stored in participant profiles 340 for the user. If the user already exists within participant profiles 340, the profile of the participant can be retrieved. This can allow fast and convenient location of participant data for each participant that may be referenced in the future. The participant profiles 340 can store known characteristics associated with each identified participant. For example, participant profiles 340 can store roles, teams, organizations, locations, and other participant characteristics for each participant.

Participant analyzer 325 can be configured to analyze the identified participants within the initiated web conference to determine characteristics of each participant. In embodiments, participant analyzer 325 can reference participant profiles 340 to obtain characteristics for any participants that have entries within participant profiles 340. As discussed above, a variety of participant characteristics can be stored within participant profiles 340, including, but not limited to, participant roles (e.g., engineer, manager, accounting, logistics, etc.), participant organizations (e.g., company A, company B, etc.), participant teams (e.g., development team, integration team, software team, hardware team, etc.), participant locations (e.g., residence and/or company location for participants), participant age, participant gender, participant education history (e.g., undergraduate and graduate credentials), etc. The participant analyzer 325 can be configured to populate new entries for any new participants that are identified in the initiated web conference. In embodiments, participant analyzer 325 can be configured to search through, parse, crawl, or otherwise navigate participant data (e.g., employee data, social media data, web conference data, web page data, or any other data participants provide opt-in access to) associated with participants to determine characteristics associated with participants.

Participant analyzer 325 can additionally be configured to perform real-time visual and/or audio analysis of participant audio/video (A/V) feeds to determine participant characteristics while the web conference is occurring. For example, image analysis techniques such as object recognition techniques (e.g., region-based convolutional neural networks (R-CNNs), you only look once (YOLO), scale-invariant feature transform (SIFT), and other object recognition techniques), visual sentiment analysis, and image segmentation techniques (e.g., clustering) can be performed to obtain participant visual characteristics. Audio analysis such as speech analytics (e.g., speech recognition, tone analysis, speech-to-text etc.) can be performed to obtain participant audio characteristics.

The determined visual and/or audio characteristics can be integrated within augmentation rules. For example, participant visual characteristics that can be integrated into augmentation rules include objects possessed by participants (e.g., a pencil held by the user), attire worn by participants (e.g., a watch worn by a participant, a hat worn by a participant, a suit worn by a participant, etc.), visual facial expression classification of participants (e.g., angry, happy, etc.), and other potential visually discernable characteristics. As an example, in response to identifying a first object possessed by a participant (e.g., a glass of water), a first item of attire worn by a participant (e.g., a bow tie), and/or a first visual sentiment expression of a participant (e.g., a happy facial expression), a corresponding augmentation rule can be triggered to cause an augmentation to be applied to the participant's video feed.

Participant audio characteristics that can be integrated into augmentation rules include a detected tone of participants (e.g., frustrated, excited, relieved, etc.), detected speech characteristics (e.g., amplitude and frequency) of participants, detected phrases/keywords uttered by participants, and other potential audibly discernable characteristics. As an example, in response to detecting a first tone of a participant (e.g., a negative tone), a first detected speech characteristic (e.g., a particular amplitude/frequency of voice) of a participant, and/or a first detected keyword/phrase uttered by a first participant (e.g., the participant utters the phrase "please change my outfit"), a corresponding augmentation rule can be triggered to cause an augmentation to be applied to the participant's video feed.

It is noted that any number and/or type of the above visual/audio characteristics can be integrated into an augmentation rule defining one or more augmentations to apply to participant video feeds based on the observed characteristics.

It is noted that though reference is made to determining certain participant characteristics (e.g., audio/visual participant characteristics) while an initiated web conference is ongoing, any number of participant characteristics can be determined prior to, during, and/or after an initiated web conference without departing from the spirit and scope of the present disclosure.

The participant augmenter 330 can be configured to determine whether any augmentation rules are met and, in response to determining that an augmentation rule is met (e.g., satisfied), apply augmentations on applicable participant video feed(s) based on the satisfied augmentation rule. Thus, the participant augmenter 330 receives the augmentation rule set defined by the augmentation rule definer 315 and the determined participant characteristics from the participant analyzer 325 such that a determination can be made whether any augmentation rules within the augmentation rule set are satisfied. Responsive to any augmentation rules being satisfied, the participant augmenter 330 augments the video feed(s) of the participant(s) as defined within the augmentation rules. Determining whether an augmentation rule is met can include determining whether a particular participant characteristic mapped to an augmentation defined in the augmentation rule is observed.

The participant augmenter 330 includes an image segmenter 332 which can be configured to perform image segmentation on frames within participant video feeds such that a portion (e.g., a subset of pixels) of each participant video feed to modify and a portion of each participant video feed to leave unmodified can be determined. The pixel areas of each video feed to modify and leave unmodified depend on the specific augmentation to apply as set forth in the augmentation rule set. For example, a first augmentation within the augmentation rule set can specify that a first body area (e.g., hair) of the participant should be augmented in a first particular manner (e.g., changed to a different color). As another example, a second augmentation within the augmentation rule set can specify that a second body area (e.g., torso) should be augmented in a second particular manner (e.g., overlayed with an augmented suit). Thus, for each participant video feed based on each applicable augmentation to apply, the image segmenter 332 can be configured to determine pixels of each video feed to modify and pixels of each video feed to leave unmodified.

In embodiments, segmentation of video feeds by image segmenter 332 to identify a portion of the video feed to modify and a portion of the video feed to leave unmodified can include methods for semantic segmentation (e.g., determining a class of object (e.g., hair) for each pixel), instance segmentation (e.g., determining a specific instance of an object (e.g., a first participant's hair) for each pixel), and/or panoptic segmentation (e.g., a hybrid approach where distinguishments of different instances of the same class of object can be made).

Image segmentation performed by image segmenter 332 can, in embodiments, utilize one or more machine learning algorithms, such as neural networks. Training of machine learning algorithms can occur over time such that real-time identification of pixels of video feeds of participants to modify based on specific augmentations to apply can be completed. For example, a neural network can be trained over time to identify pixels associated with a first body area (e.g., shoulder, head, chest, etc.) such that a first virtual augmentation can be applied on the pixels associated with the first body area. Thus, each augmentation to apply can be mapped to a specific feature (e.g., body area) associated with participants, and each specific feature to modify can be learned overtime using machine learning techniques (e.g., supervised or unsupervised machine learning).

A variety of image segmentation techniques can be used by image segmenter 332 to identify portions of video feeds to modify (e.g., to apply augmentations to) including, but not limited to: clustering (e.g., K-means clustering), compression-based methods, histogram-based methods, edge detection, region-growing, partial differential equal-based methods (e.g., parametric methods, level-set methods, fast marching methods), graph partitioning methods (e.g., Markov random fields (MRF)), watershed transformation, model-based segmentation, multi-scale segmentation, semi-automatic segmentation, and trainable segmentation (e.g., neural networks such as U-Net), among other image segmentation techniques.

The image augmenter 334 then modifies each applicable video feed of each participant in accordance with the augmentations defined in the augmentation rule set. As discussed above, any suitable augmentations can be applied to participant video feeds, including, but not limited to overlaying augmented/virtual objects such as virtual attire (e.g., virtual cloths), virtual symbols or markings (e.g., a virtual shape or symbol added to a participant's shirt), and virtual avatars (e.g., a virtual character's head can be overlayed on a participant) over specific areas of pixels, applying color changes (e.g., changing a participants t-shirt color) to specific areas of pixels, applying feature morphs (e.g., enlarging a participant's head, blurring a participant's shirt, etc.) to specific areas of pixels, and other potential augmentations. The image augmenter 334 can modify pixel data (e.g., pixel color values) in any suitable manner. In embodiments, pixels associated with frames of any suitable resolution can be modified to achieve desired augmentation effects. The selection of pixels to modify by image augmenter 334 can be determined by image segmenter 332 (e.g., the portion of pixels to modify), and the type of pixel modification to make by image augmenter 334 can be determined based on the specific augmentation defined within augmentation rules.

Upon applying augmentations on each participant video feed in accordance with the augmentation rule set, the web conference can continue to be monitored to update augmentation locations based on participant movement within video feeds (e.g., such that augmentations can track each participant's body in motion) and/or to determine whether any new augmentations should be applied (e.g., whether any additional augmentation rules within the augmentation rule set are met). For example, if a first augmentation is applied to a first participant's video feed, and the first participant changes location within their video feed frame (e.g., changes posture), then the participant augmenter 330 can be configured to determine a new set of pixels to modify (e.g., via image segmenter 332) such that the first image augmentation can be updated based on the first participant's movement. As another example, if new augmentation rules are triggered (e.g., met or satisfied) based on dynamically changing visual/audio characteristics of participants, then new augmentations can be applied by the participant augmenter 330. Similarly, if currently applied augmentation rules are no longer triggered (e.g., no longer met or satisfied) based on dynamically changing visual/audio characteristics of participants, then augmentations associated with the augmentation rule which are no longer met can be ceased.

Figure 4:
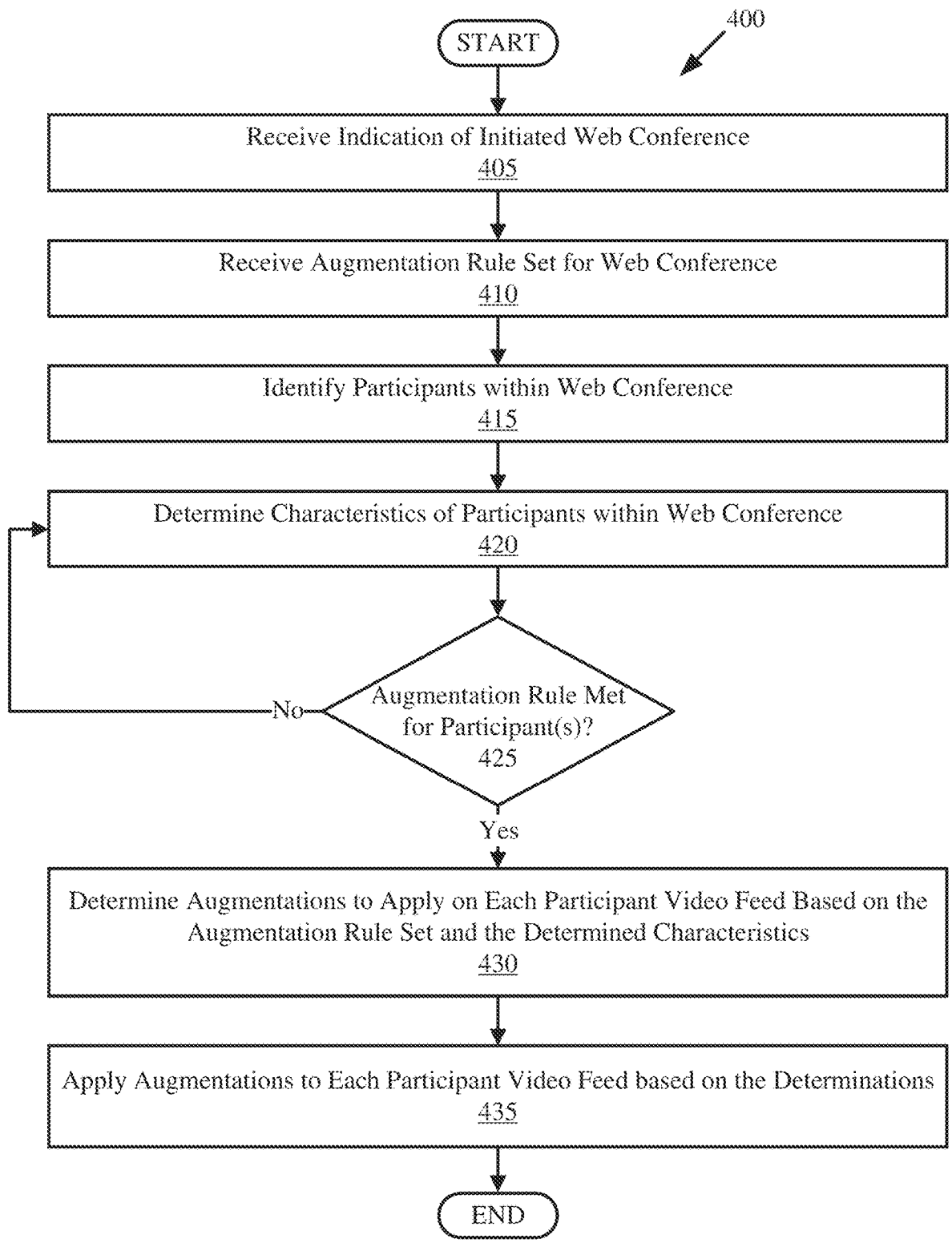
FIG. 4 is a flow-diagram illustrating an example method for augmentation of participants of a web conference, in accordance with embodiments of the present disclosure.

Referring now to FIG. 4, shown is a flow-diagram of an example method 400 for participant augmentation management, in accordance with embodiments of the present disclosure. One or more operations of method 400 can be completed by one or more processing circuits (e.g., computer 101, devices 205, server 235, user devices 355/370, and/or PAMS 305).

Method 400 initiates at operation 405, where an indication of an initiated web conference can be received. The web conference can be hosted on web conference software and can be the same as, or substantially similar to, web conference software (not shown) described with respect to FIG. 2, or web conference software 375 described with respect to FIG. 3.

An augmentation rule set for the web conference is received. This is illustrated at operation 410. The augmentation rule set can be obtained/defined/selected or otherwise received in the same, or a substantially similar manner, as described with respect to PAMA 260 of FIG. 2 and augmentation rule definer 315 of FIG. 3. For example, the augmentation rule set can be defined/retrieved based on web conference characteristics determined by web conference characteristic identifier 310. In some embodiments, the augmentation rule set can be manually defined. In some embodiments, the augmentation rule set can be automatically defined using AI/ML algorithms based on historical data (e.g., historical web conference data and associated historically applied augmentation rule sets).

Participants within the web conference are then identified. This is illustrated at operation 415. Identification of participants within the web conference can be completed in the same, or a substantially similar manner, as described with respect to participant identifier 320 of FIG. 3. Characteristics of participants within the web conference are then determined. This is illustrated at operation 420. Determining characteristics of participants can be completed in the same, or a substantially similar manner, as described with respect to the participant analyzer 325 of FIG. 3. For example, determining participant characteristics can include referencing participant profiles 340 storing known characteristics for identified participants. Further, determining participant characteristics can include real-time audio/video analysis of participant A/V feeds.

A determination is then made whether an augmentation rule is met for one or more participants. This is illustrated at operation 425. Determining whether any augmentation rules are met can be completed in the same, or a substantially similar manner, as described with respect to the participant augmenter 330 of FIG. 3. For example, responsive to observing any participant characteristics mapped to augmentations within augmentation rule set, a determination can be made that an augmentation rule is met.

If a determination is made that no augmentation rules are met for participants, then method 400 returns to operation 420 where characteristics of participants can continue to be analyzed (e.g., continuously, intermittently, periodically, or over any other suitable interval). This can be completed such that if any participant characteristics within augmentation rule set are determined during the web conference, a corresponding augmentation can be applied per the augmentation rule set.

If a determination is made that an augmentation rule is met for one or more participants, then an augmentation to apply on each participant video feed that met the augmentation rule is determined. This is illustrated at operation 430. In embodiments, determining augmentations to apply onto each participant video feed can be completed in the same, or a substantially similar manner, as described with respect to the image segmenter 332 and image augmenter 334 of FIG. 3. For example, if a first augmentation rule is met such that a first augmentation (e.g., overlay virtual suit over participant body) is completed for any participants having a first characteristic (e.g., a specific team role, such as engineering), then determining the augmentation to apply would include referencing the specific augmentation within the first augmentation rule. In this example, the augmentation would include overlaying a virtual suit of any participant's bodies having a particular participant characteristic. Determining the location to overlay the suit within each video feed of each participant can be completed using image segmentation, as described above. This can be completed for each augmentation rule that is met at operation 425 (e.g., multiple different augmentations can be applied to the same, or different, participant video feeds according to different augmentation rules).

The augmentations are then applied to each applicable participant video feed based on the determined augmentations to apply. This is illustrated at operation 435. This can be completed in the same, or a substantially similar manner, as described with respect to the participant augmenter 330 of FIG. 3. For example, selection of pixels to modify and the specific modifications to make to the pixels can be determined via image segmentation and a corresponding augmentation to apply based on the triggered augmentation rule.

The aforementioned operations can be completed in any order and are not limited to those described. Additionally, some, all, or none of the aforementioned operations can be completed, while still remaining within the spirit and scope of the present disclosure.

Figure 5:
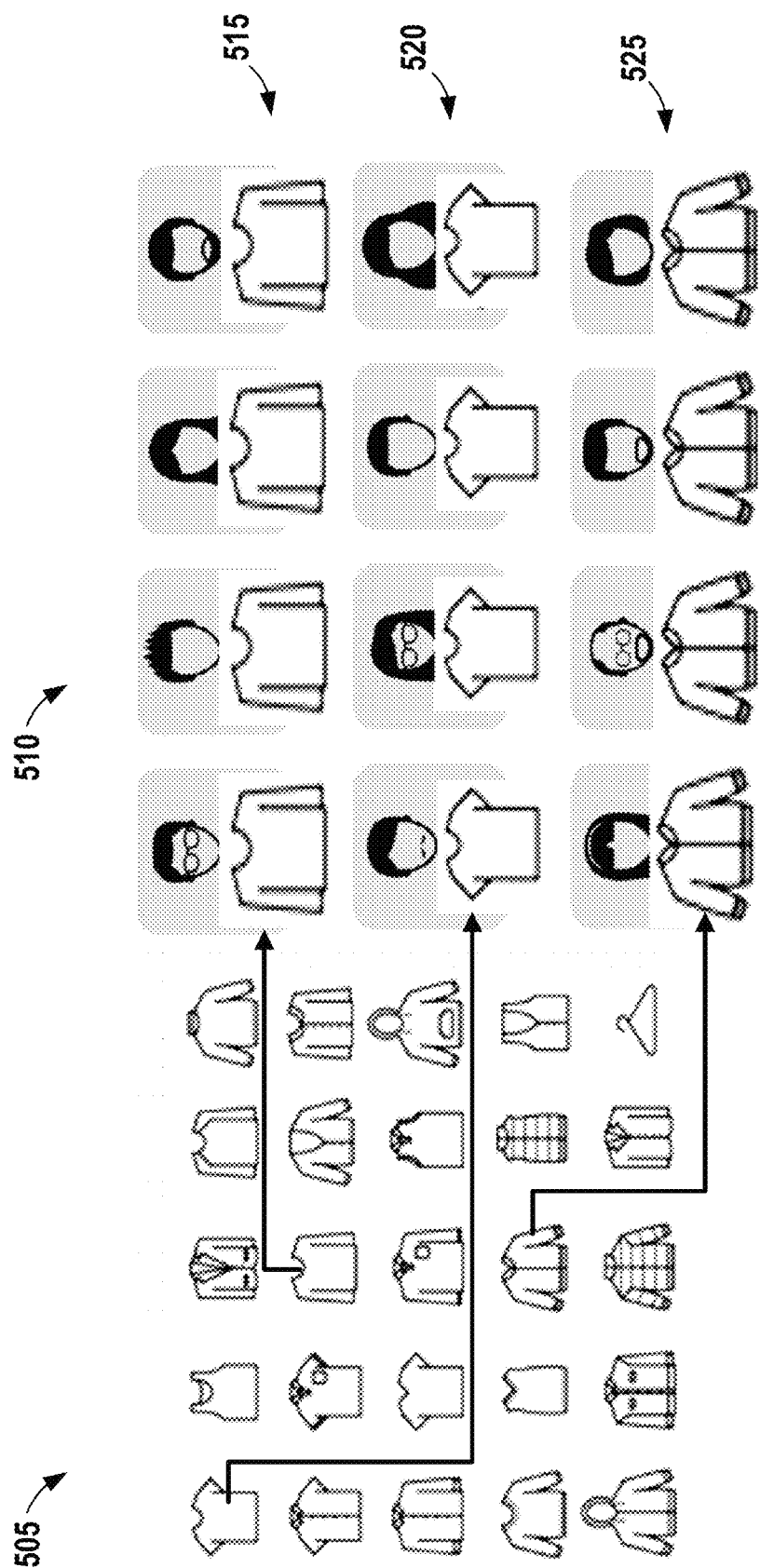
FIG. 5 is a diagram illustrating example participant augmentations within a web conference environment, in accordance with embodiments of the present disclosure.

Referring now to FIG. 5, shown is a diagram illustrating example augmentation of web conference participants, in accordance with embodiments of the present disclosure. As shown in FIG. 5, an augmentation catalog 505 is depicted. The augmentation catalog 505 can include various options for augmenting participants. In the example depicted in FIG. 5, the augmentation catalog 505 includes various virtual outfits (e.g., virtual t-shirts, suits, hoodies, coats, vests, etc.) that can be overlayed on participant video feeds. Participant video feeds 510 are shown as being augmented with augmentations indicated in the augmentation catalog 505.

As shown in FIG. 5, a first set of participants 515 sharing common participant characteristic (e.g., belonging to the same class, such as team (integration)) are augmented with a first item of virtual attire within the augmentation catalog 505, a second set of participants 520 sharing common participant characteristics (e.g., team (development)) are augmented with a second item of virtual attire within augmentation catalog 505, and a third set of participants 525 sharing common participant characteristics (e.g., team (sales)) are augmented with a third item of virtual attire within augmentation catalog 505. The above-referenced augmentations can be completed based on a defined augmentation rule set. Augmentation, as depicted in FIG. 5, can be completed using one or more methods described above with respect to FIGS. 2-4.

Though reference is made to an example augmentations within augmentation catalog 505, any suitable augmentations can be included as options for augmentation (e.g., different items of virtual attire, color changes, feature morphs, etc.). Further, though reference is made to specific augmentations to make based on specific participant characteristics (e.g., classification such as team, as referenced above), any suitable augmentations can be made based on any suitable participant characteristics. In embodiments, the same augmentations can be applied to different observed participant characteristics (e.g., the same augmentations can be mapped to different observed participant characteristics within augmentation rule set).

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

What is claimed is:

1. A method comprising:

receiving a first augmentation rule set defining a first set of mappings between augmentations and participant characteristics and a second augmentation rule set defining a second set of mappings between augmentations and participant characteristics, the first and second augmentation rule sets implemented to determine augmentations to apply onto participant video feeds within web conferences, wherein respective augmentation rule sets are applied to respective web conferences;

identifying a plurality of participants within a web conference, the web conference having a set of web conference characteristics;

determining that the first augmentation rule set should be applied to the web conference instead of the second augmentation rule set based on a web conference meeting identifier (ID) associated with the web conference;

analyzing the web conference to determine participant characteristics of respective participants of the plurality within the web conference; and applying, within the web conference, augmentations on respective applicable video feeds of respective participants according to the first augmentation rule set based on the determined characteristics of each participant.

2. The method of claim 1, wherein applying augmentations on respective applicable video feeds of respective participants includes determining a portion of pixels of each respective video feed to modify using image segmentation.

3. The method of claim 1, wherein the determined characteristics include visual characteristics of participants determined in real-time based on an analysis of the video feeds of each participant.

4. The method of claim 1, wherein the determined characteristics include audio characteristics of participants determined in real-time based on an analysis of audio data associated with video feeds of each participant.

5. The method of claim 1, wherein a first augmentation is applied to a first participant video feed based on a first participant associated with the first participant video feed belonging to a first classification.

6. The method of claim 5, wherein a second augmentation is applied to a second participant video feed based on a second participant associated with the second participant video feed belonging to a second classification.

7. The method of claim 1, wherein the first augmentation rule set is determined using machine learning based on historical data.

8. A system comprising:

one or more processors; and one or more computer-readable storage media collectively storing program instructions which, when executed by the one or more processors, are configured to cause the one or more processors to perform a method comprising:

receiving a first augmentation rule set defining a first set of mappings between augmentations and participant characteristics and a second augmentation rule set defining a second set of mappings between augmentations and participant characteristics, the first and second augmentation rule sets implemented to determine augmentations to apply onto participant video feeds within web conferences, wherein respective augmentation rule sets are applied to respective web conferences;

identifying a plurality of participants within a web conference, the web conference having a set of web conference characteristics;

determining that the first augmentation rule set should be applied to the web conference instead of the second augmentation rule set based on a web conference meeting identifier (ID) associated with the web conference;

analyzing the web conference to determine participant characteristics of respective participants of the plurality within the web conference; and applying, within the web conference, augmentations on respective applicable video feeds of respective participants according to the first augmentation rule set based on the determined characteristics of each participant.

9. The system of claim 8, wherein applying augmentations on respective applicable video feeds of respective participant includes determining a portion of pixels of each respective video feed to modify using image segmentation.

10. The system of claim 9, wherein the image segmentation is a machine learning algorithm configured to learn pixel areas to modify for different augmentations to apply within the first augmentation rule set.

11. The system of claim 8, wherein a first augmentation is applied to a first participant video feed based on a first participant associated with the first participant video feed belonging to a first classification.

12. The system of claim 8, wherein the first augmentation rule set is mapped to a first set of web conference characteristics and wherein the second augmentation rule set is mapped to a second set of web conference characteristics, wherein the one or more computer-readable storage media collectively store additional program instructions which, when executed by the one or more processors, are configured to cause the one or more processors to perform the method further comprising:

determining that a second web conference hosted at a future time has the first set of web conference characteristics; and applying the first augmentation rule set to the second web conference instead of the second augmentation rule set based on the second web conference having the first set of web conference characteristics.

13. A computer program product comprising one or more computer readable storage media, and program instructions collectively stored on the one or more computer readable storage media, the program instructions comprising instructions configured to cause one or more processors to perform a method comprising:

receiving a first augmentation rule set defining a first set of mappings between augmentations and participant characteristics and a second augmentation rule set defining a second set of mappings between augmentations and participant characteristics, the first and second augmentation rule sets implemented to determine augmentations to apply onto participant video feeds within web conferences, wherein respective augmentation rule sets are applied to respective web conferences;

identifying a plurality of participants within a web conference, the web conference having a set of web conference characteristics;

determining that the first augmentation rule set should be applied to the web conference instead of the second augmentation rule set based on a web conference meeting identifier (ID) associated with the web conference;

analyzing the web conference to determine participant characteristics of respective participants of the plurality within the web conference; and applying, within the web conference, augmentations on respective applicable video feeds of respective participants according to the first augmentation rule set based on the determined characteristics of each participant.

14. The computer program product of claim 13, wherein applying augmentations on respective applicable video feeds of respective participants includes determining a portion of pixels of each respective video feed to modify using image segmentation.

15. The computer program product of claim 14, wherein the image segmentation is a machine learning algorithm configured to learn pixel areas to modify for different augmentations to apply within the first and second augmentation rule sets.

16. The computer program product of claim 13, wherein a first augmentation is applied to a first subset of participants of the plurality based on the first subset of participants belonging to a first organization, wherein a second augmentation is applied to a second subset of participants of the plurality based on the second subset of participants belonging to a second organization.

17. The computer program product of claim 13, wherein a first augmentation is applied to a first participant of the plurality based on the first participant having a first geolocation.

* * * * *